United States Patent [19]

Nordstrom

[11] 3,899,092
[45] Aug. 12, 1975

[54] CARGO-CARRYING STRUCTURAL MODULES

[76] Inventor: Arnold B. Nordstrom, 3855 Paseo de las Tortugas, Torrance, Calif. 90505

[22] Filed: July 3, 1973

[21] Appl. No.: 376,122

[52] U.S. Cl............ 214/84; 105/366 D; 244/118 R; 244/137 R
[51] Int. Cl.............................................. B60p 1/00
[58] Field of Search.......... 214/84; 244/118, 137 R; 105/368 R, 368 T, 369 A, 366 D

[56] References Cited
UNITED STATES PATENTS

| | | | |
|---|---|---|---|
| 2,334,124 | 11/1943 | Peterson | 214/84 |
| 3,381,921 | 5/1968 | McDonough et al. | 214/84 |

FOREIGN PATENTS OR APPLICATIONS

| | | | |
|---|---|---|---|
| 1,062,462 | 4/1954 | France | 244/118 R |

Primary Examiner—Robert J. Spar
Assistant Examiner—Donald W. Underwood
Attorney, Agent, or Firm—John Holtrichter, Jr.

[57] ABSTRACT

A quickly removable (or installable) modular cargo-carrying system for use in vehicles such as aircraft, trucks, and the like, of the type having structural floor members and roller-mounted cargo supporting floor panels therebetween. The system is especially useful in applications where the cargo containers are of such dimensions that they may not extend from one structural floor member to another. The system includes relatively lightweight roller trays having spring loaded or resilient mountings whereby cargo containers are supported by the roller trays about one-eighth inch above longitudinal and transverse beams of the system, the beams picking up the load exerted by the cargo containers and transfer it to the structural floor members when the resilient roller tray mounts bottom-out upon being subjected to a predetermined load. The longitudinal beam assemblies incorporate foot operated locks for restraining the containers under the required operating conditions.

9 Claims, 17 Drawing Figures

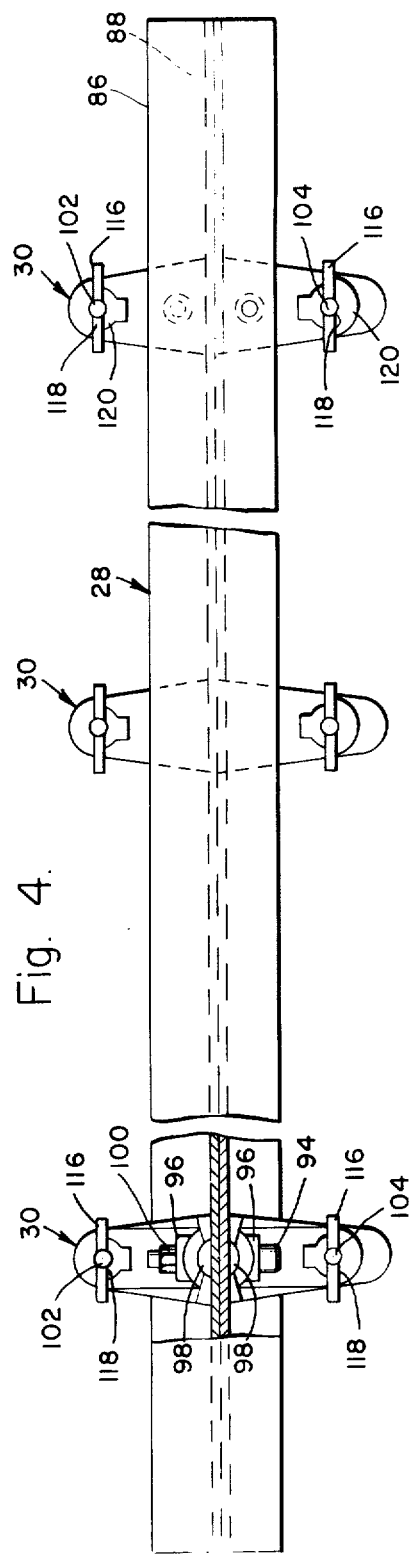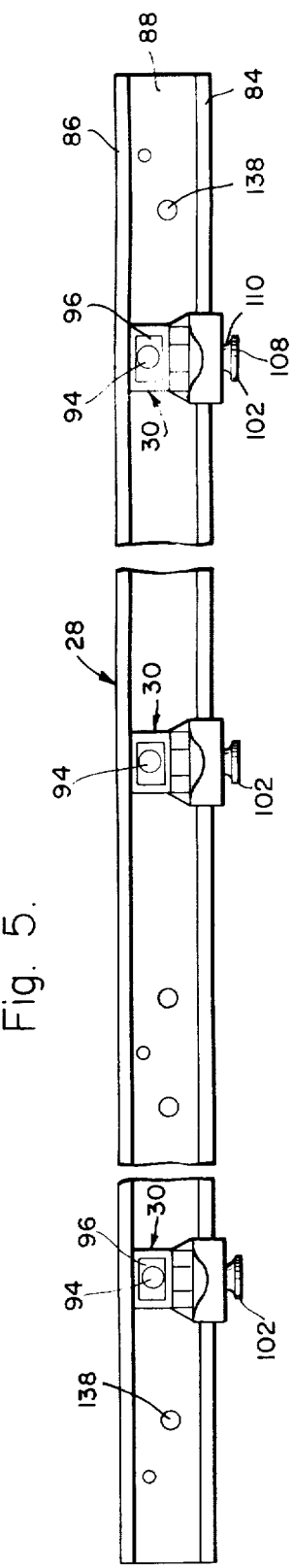

PATENTED AUG 12 1975 3,899,092

SHEET 5

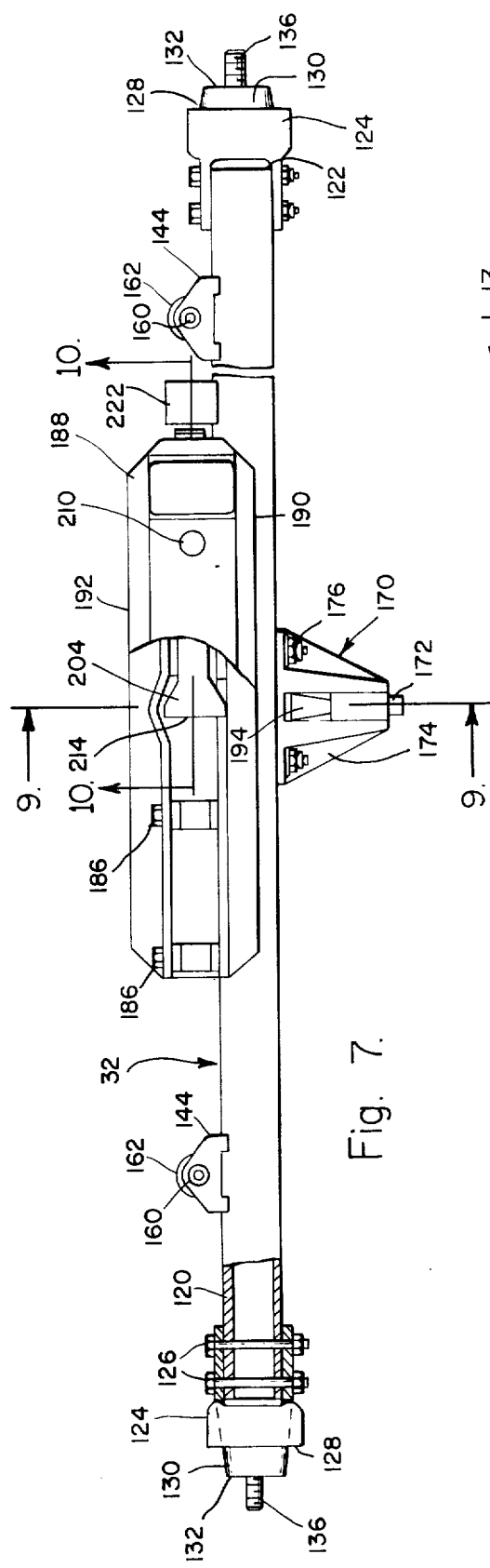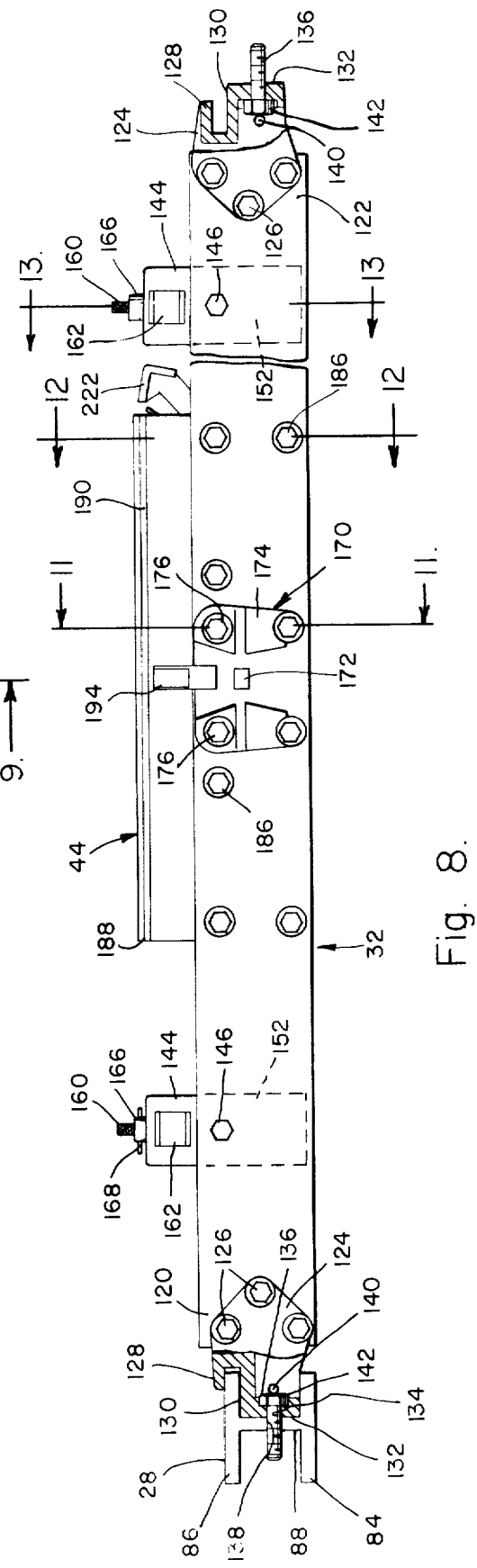
Fig. 7.
Fig. 8.

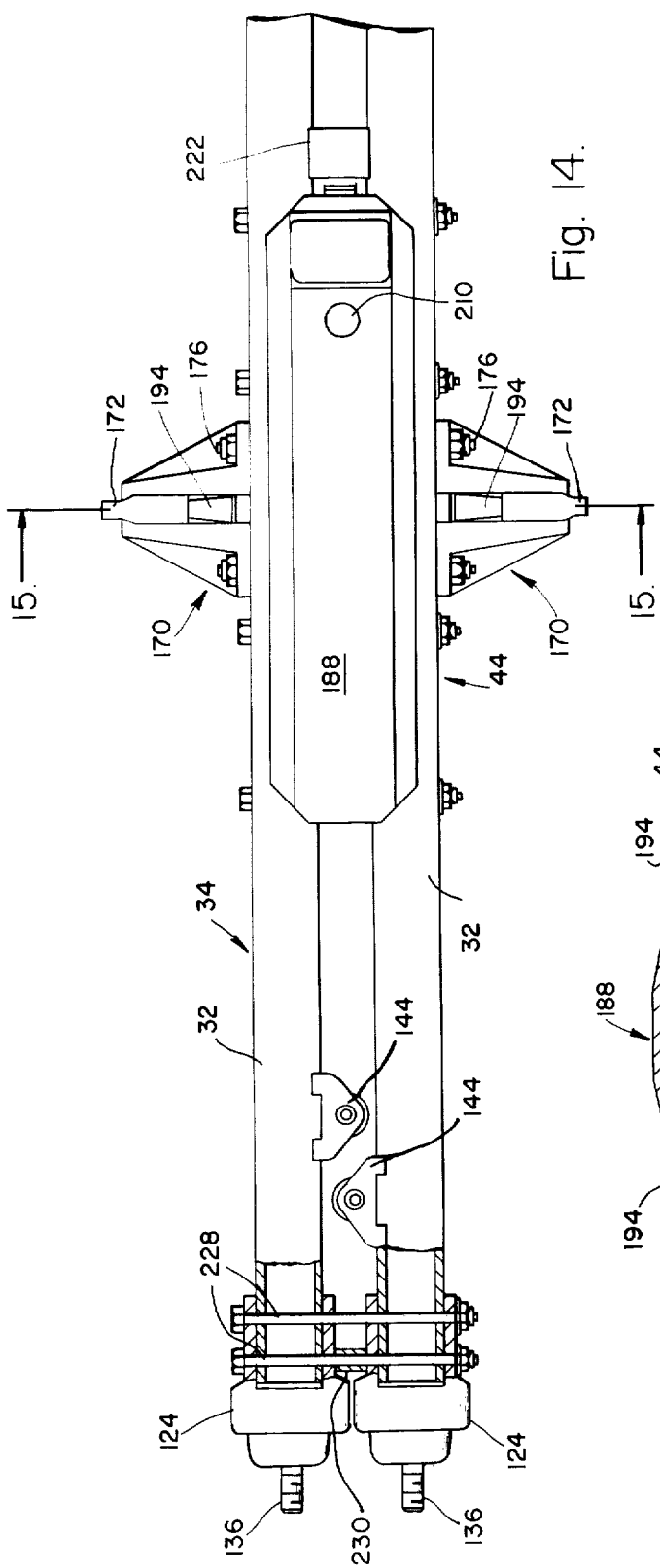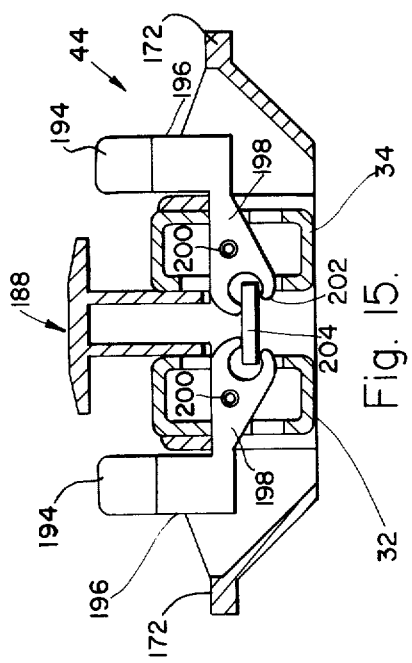

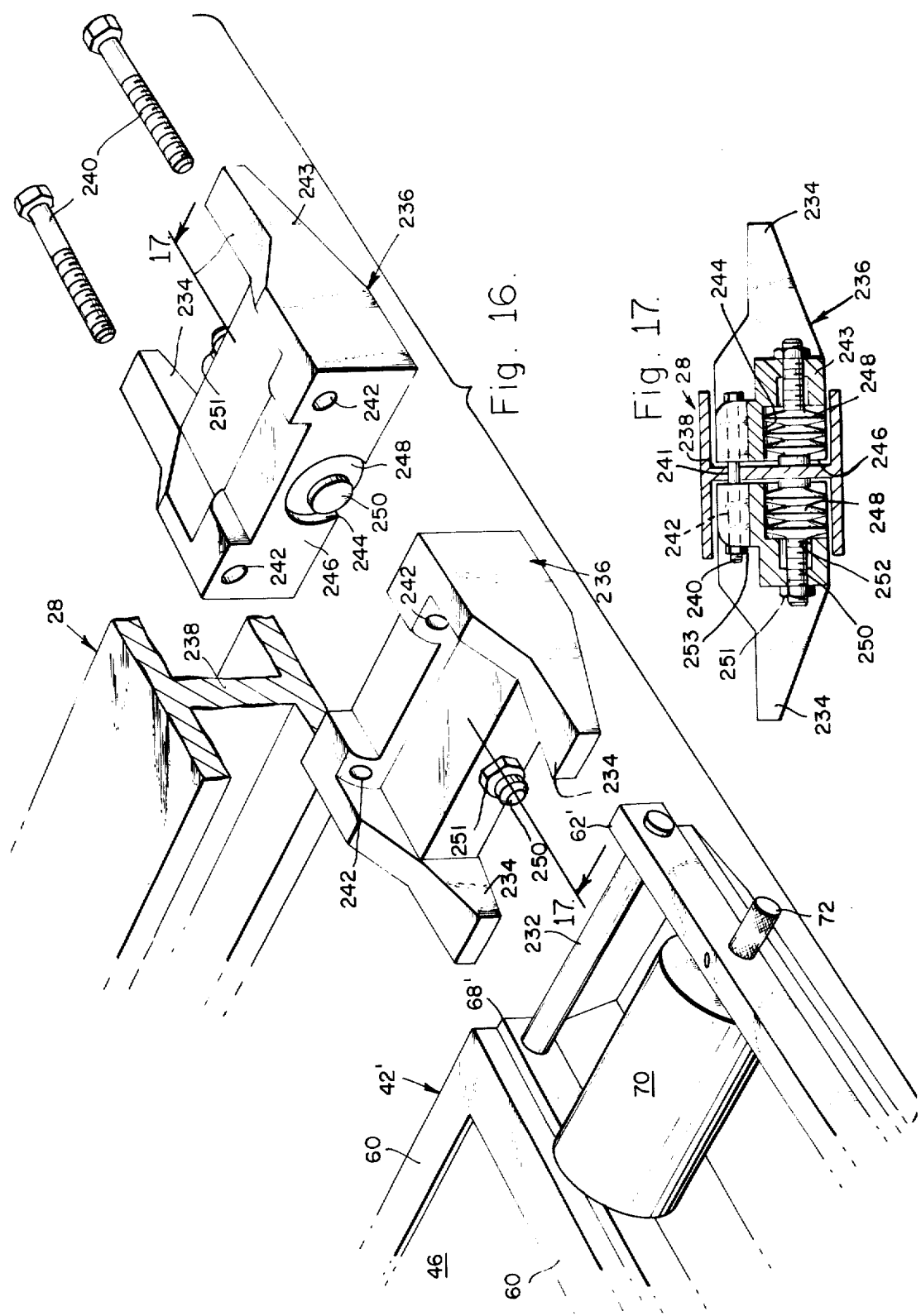

CARGO-CARRYING STRUCTURAL MODULES

BACKGROUND OF THE INVENTION

The background of the invention will be set forth in two parts.

1. Field of the Invention

The present invention pertains generally to the field of cargo transportation and more particularly to a modular, cargo-carrying system for use in vehicles such as aircraft, trucks, and the like.

2. Description of the Prior Art

When cargo is carried in certain vehicles, such as aircraft, it is customary to place the container support media (rollers) directly over the tracks to which floor panels and interior furnishings are attached. This is due to the fact that the floor panels of commercial aircraft are generally of very lightweight construction suitable only for walking loads. The panels would very likely be damaged if the aircraft were to be subjected to a down load or gust so that a load imposed upon the floor panels by the containers would suddenly exceed that for which the floor panels were designed.

Most cargo-carrying systems employ a plurality of tracks having rollers thereon over which the cargo containers may be easily moved into position. The cargo pallets or containers normally span several or all of the tracks and are held in selected positions along the tracks by suitable latching means. The tracks transfer the weight of the containers directly to the vehicle floor beams and there are no loads imposed directly on the floor panels.

The present invention is applicable to containers of such dimensions that they may not extend from one floor track (or beam) to the other so that, the support rollers must of necessity be placed in the area of the lightweight floor panels. Some means must therefore be provided to avoid overloading the panels under severe operating conditions.

Thus, it should be evident that a new and improved technique for supporting cargo containers in vehicles such as aircraft, for example, would constitute a significant advancement of the art.

SUMMARY OF THE INVENTION

In view of the foregoing factors and conditions characteristic of the prior art, it is a primary object of the present invention to provide a new and useful load-carrying system for vehicles.

Another object of the present invention is to provide vehicle cargo-carrying structural modules including relatively lightweight cargo-supporting rollers, the rollers being capable of effectively supporting cargo containers having such dimensions that they may not extend from one of the vehicle's structural load bearing member to another.

Still another object of the present invention is to provide lightweight cargo-carrying structural modules for vehicles such as aircraft and the like, the modules including resiliently supported cargo-supporting rollers which transfer load forces from the relatively lightweight rollers to the vehicle's structural load bearing members whenever a predetermined maximum load is experienced due to external causes such as from vehicle operation under severe operating conditions.

Yet another object of the present invention is to provide a load carrying system of the type described which includes resiliently supported roller means normally supporting cargo containers in spaced relationship with structural beams which beams pick up the load imposed by the containers when the containers are subjected to loads during movement of the vehicle which might exceed the structural integrity of the rollers.

Still a further object of the present invention is to provide a load carrying system of the type described that includes cargo-supporting lightweight roller trays mounted on elastomeric members which normally support cargo containers on the floor of the vehicle is spaced relationship with the structural beams whereby the beams pick up the load imposed by the containers when they are subjected to loads exceeding the structural integrity of the vehicle's floor.

Yet a further object of the present invention is to provide a load carrying system of the type described that includes cargo supporting, lightweight roller trays mounted on spring-loaded fingers which fingers normally support cargo containers above modular beams of the system except when loads are experienced that would exceed the structural integrity of the tray-mounted rollers.

A further object of the present invention is to provide a load carrying system of the type described that includes foot operated locks for restraining cargo containers in a fixed but removable position in the vehicle.

In accordance with an embodiment of the present invention, a load carrying system is provided for vehicles having a floor structure including a major axis, a minor axis and a plurality of tracks secured to the floor structure substantially parallel to the major axis and in a spaced-apart relationship which is greater than the width dimension of cargo containers to be carried by the vehicle.

The load-carrying system includes a plurality of transverse beams connected to the tracks substantially normal thereto in such a manner that the transverse beams are spaced apart and extend above the floor structure. A plurality of longitudinal beams are connected to the transverse beams also in spaced relationship and extend above the floor structure. Cargo containers are then supported on resiliently-mounted roller trays. The resiliently-mounted roller trays comprise means normally supporting the containers in spaced relationship with the beams but are capable of transferring loads exceeding a predetermined load to the beams by the imposition of a down load or gust exceeding a predetermined G load on the cargo containers.

The cargo containers are shaped in such a manner that the bottom of the cargo container normally rests upon rollers carried by the roller trays with a longitudinal lip or flange being positioned along the longitudinal beams approximately one-eighth inch above the beams. Thus, when the roller trays are depressed more than one-eighth inch, the additional load imposed by the down load is picked up by the longitudinal and transverse beams which, in turn, transfer the load to the tracks.

A new and useful stop means is provided on the longitudinal beams as required for maintaining the cargo containers in position in the vehicle under all normal and emergency operating conditions.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings in which like reference characters refer to like elements in the several views.

BRIEF DESCRIPTION OF THE DRAWINGS

FIG. 4 is an enlarged plan view of one of the transverse beams shown in the system of FIG. 1;

FIG. 5 is an elevational view of the beam shown in FIG. 4;

FIG. 7 is a plan view, with parts broken away to show internal construction, of one of the longitudinal right hand or left hand beams shown in the system of FIG. 1;

FIG. 8 is a front, elevational view of the beam of FIG. 7;

FIG. 14 is a plan view of a double type longitudinal beam used in the system of FIG. 1;

FIG. 15 is a cross-sectional view taken along line 15—15 of FIG. 14;

FIG. 16 is a perspective view of a spring loaded walk-roller panel support arrangement in accordance with another embodiment of the invention; and FIG. 17 is a sectional representation of the support members of FIG. 16 as they are pivotally mounted on the transverse beam.

DESCRIPTION OF THE PREFERRED EMBODIMENT

Figure 1:
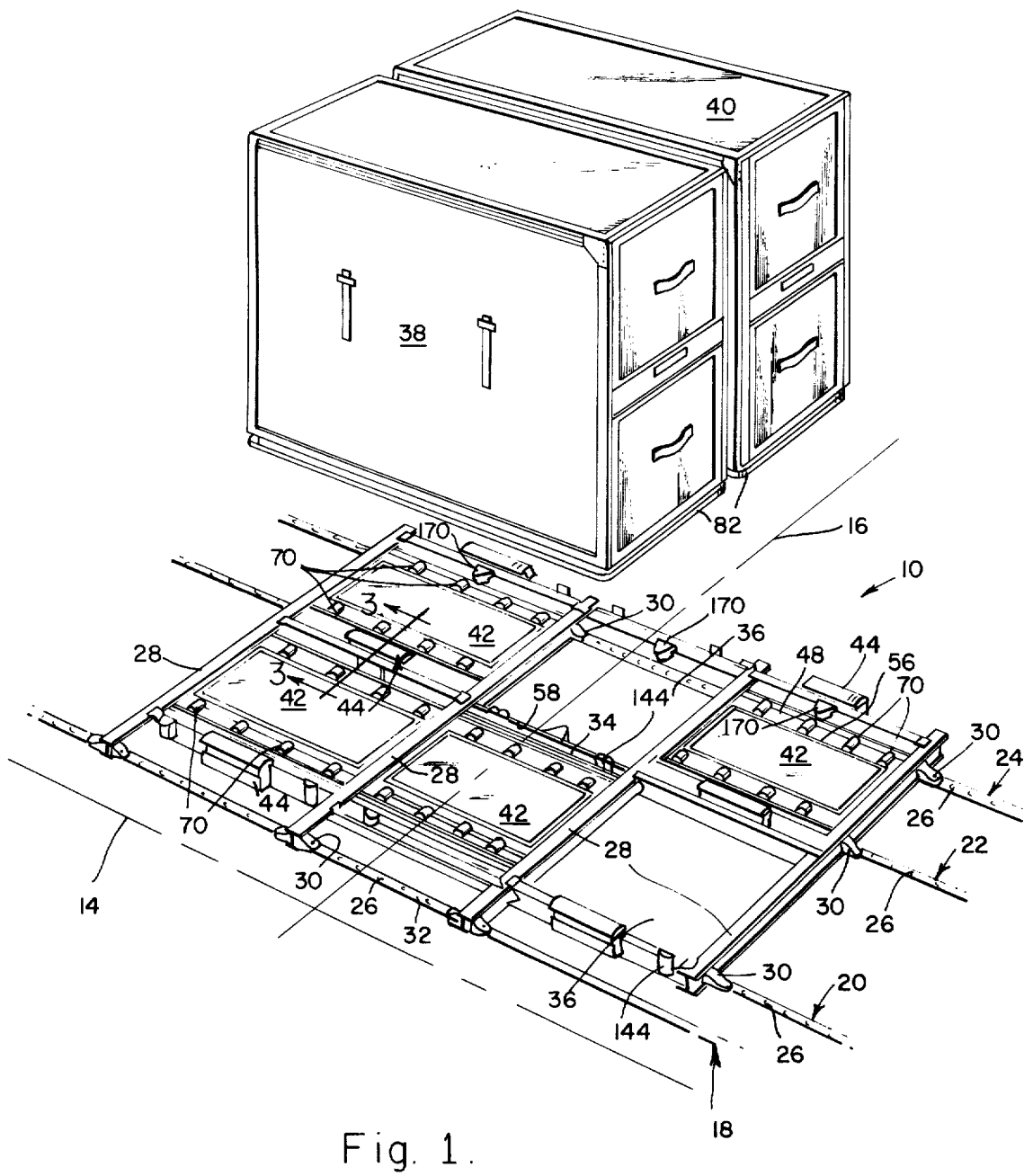
FIG. 1 is an exploded, partial perspective view of a modular, load-carrying system constituting a presently preferred embodiment of the invention.

Referring again to the drawings, and more particularly to FIG. 1, a cargo-carrying system for vehicles, generally designated 10, may be used in a suitable vehicle, such as an aircraft or the like (not shown) having a cargo-supporting floor 12 mounted above suitable floor structure, which floor may be made of individual panels (not shown) having a predetermined load-carrying capacity.

The floor 12 has a major axis 14 and a minor axis 16 and supports a plurality of tracks 18, 20, 22 and 24 which may be secured to suitable structural members (not shown) that support floor 12. The major axes of the tracks 18, 20, 22 and 24 lie substantially parallel to the major axis 14 of floor 12 and some of them may be curved to fit the contour of the vehicle in which cargo-carrying system 10 is used. The tracks are provided with a plurality of uniformly spaced apertures 26 adapted to receive securing means (to be hereinafter described in detail) for securing portions of cargo-carrying system 10 to tracks 18, 20, 22 and 24.

Cargo-carrying system 10 includes a plurality of transverse beams 28 secured to predetermined ones of the tracks 18, 20, 22 and 24 by suitable fastening means or brackets 30 which maintain beams 28 in spaced relationship with floor 12. Each beam 28 is substantially I-shaped in cross section and spans at least two tracks lying substantially normal thereto in spaced relationship on uniform centers whereby a modular structure may be constructed by connecting beams 28 together with single longitudinal beams 32, which are used near the outer ends of transverse beams 28, and double longitudinal beams 34, which are used intermediate the ends of beams 28. The longitudinal beams 32, 34 lie parallel to the longitudinal axis 14 and normal to the beams 28. This arrangement forms uniform rectangular areas 36 between the beams and these rectangular areas would normally expose floor 12 making it difficult for workmen to load cargo containers, like the ones shown at 38, 40, onto the cargo-carrying system 10. Therefore, walk-roller panels 42 may be used to cover rectangular areas 36 and to form a walkway and a container supporting medium. Cargo-containers 38, 40 are retained in position on the panels 42 by suitable restraining means 44 provided on alternate longitudinal beams 32.

Figure 2:
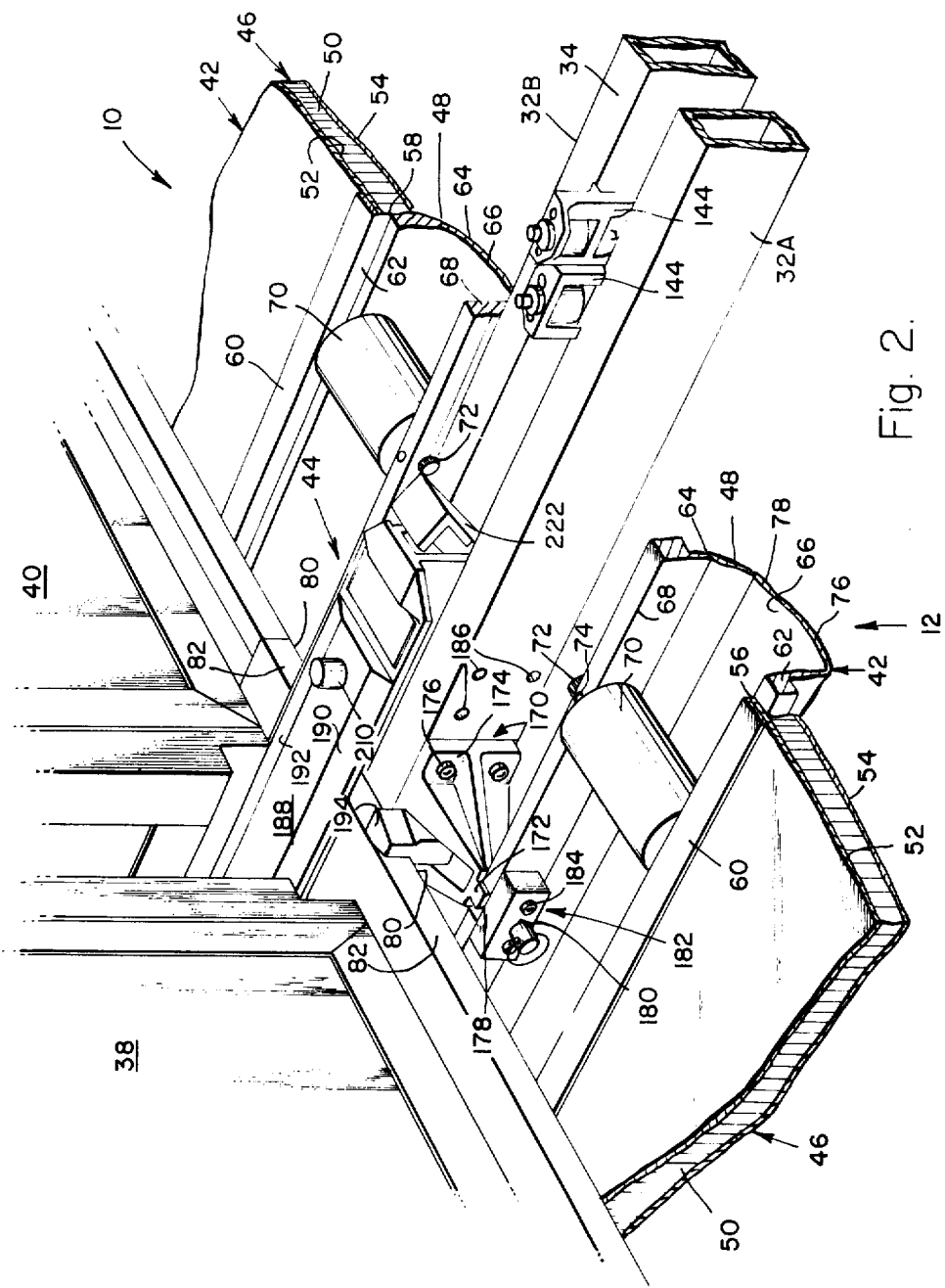
FIG. 2 is an enlarged, perspective view of the portion of the system shown in FIG. 1.
Figure 3:
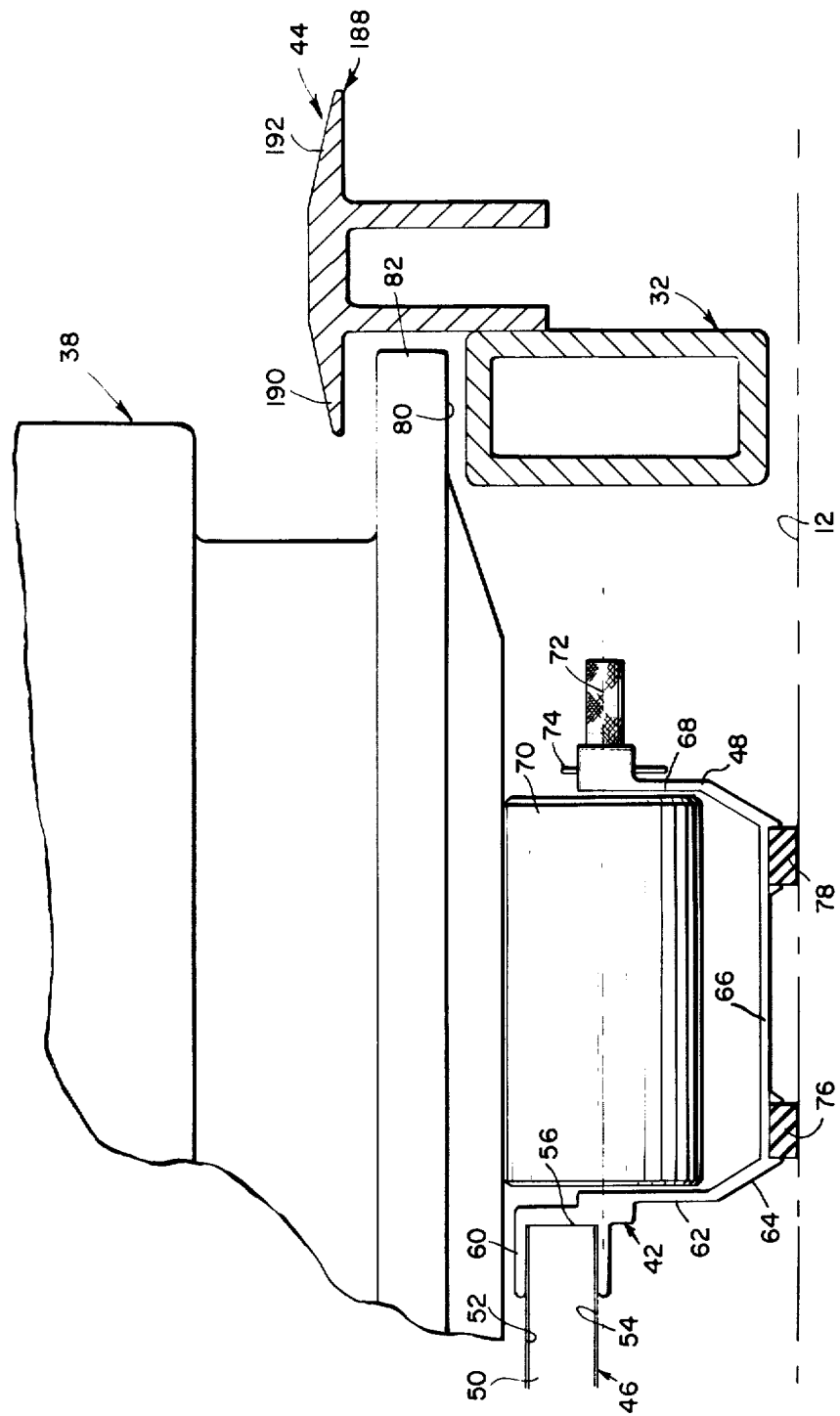
FIG. 3 is an enlarged, partial cross-sectional view taken along line 3—3 of FIG. 1.
Figure 9:
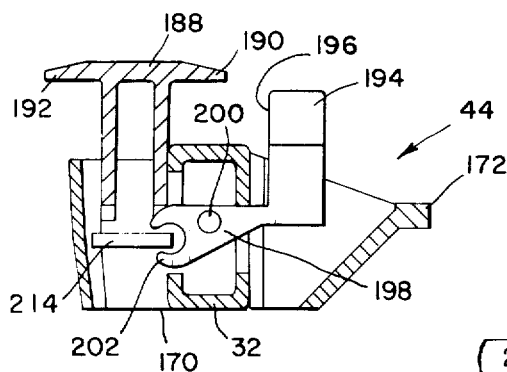
FIG. 9 is a cross-sectional view taken along line 9—9 of FIG. 7.
Figure 10:
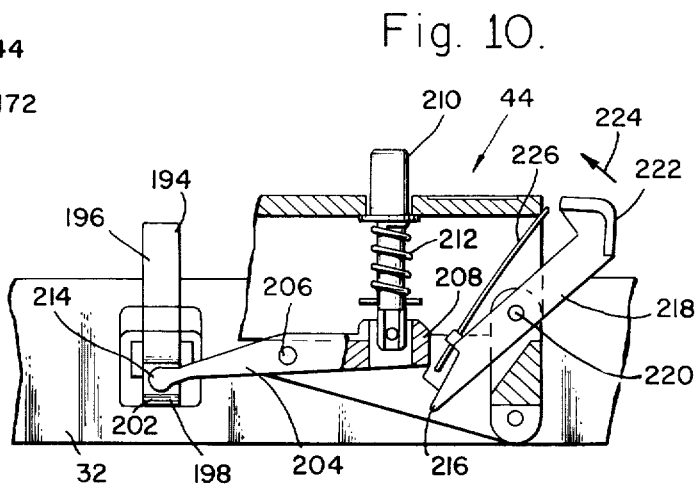
FIG. 10 is a cross-sectional view taken along line 10—10 of FIG. 7.
Figure 11:
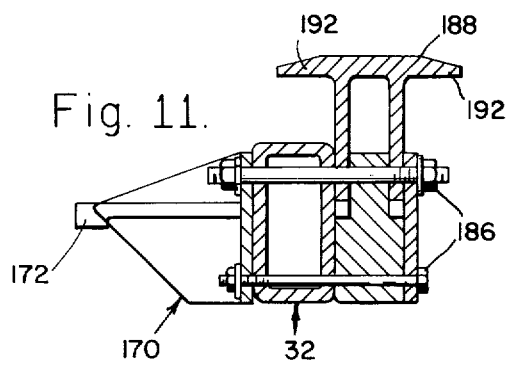
FIG. 11 is a cross-sectional view taken along line 11—11 of FIG. 8.
Figure 12:
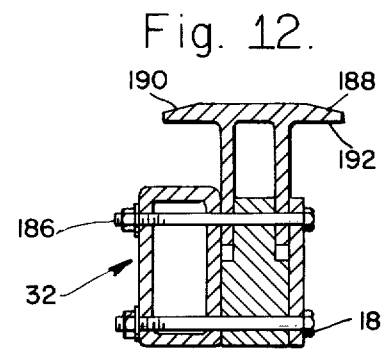
FIG. 12 is a cross-sectional view taken along line 12—12 of FIG. 8.

Referring now to FIGS. 1, 2 and 3, each walk-roller panel 42 includes a panel 46 and two roller trays 48. The panel 46 may include a balsa core 50 clad in upper and lower aluminum sheets or plates 52, 54, respectively, and the roller trays 48 may be made from a suitable material, such as aluminum. A tray 48 is permanently affixed to each edge 56, 58 of each panel 46 by a channel 60 carried by one leg 62 of a U-shaped trough 64 having a bight or base portion 66 and a second leg 68. A plurality of rollers 70, which may be made from any suitable material such as nylon or the like, are rotatably mounted in each roller tray 48 on axles 72 mounted in legs 62, 68 and retained in position therein by suitable securement means, such as the pin shown at 74 in FIG. 3. Rollers 70 are preferably staggered left and right to eliminate simultaneous contact by the cargo containers 38, 40 so that the pulse intensity normally found in roller-type systems is minimized.

In accordance with one embodiment of the invention, each roller tray 48 is supported on the floor 12 by a pair of elastomeric strips 76, 78 which distribute loads evenly on floor 12 and reduce the noise level. Additionally, elastomeric strips 76, 78 comprise floor-engaging means which transfer loads imposed by cargo carriers 38, 40 to longitudinal beams 32, 34 when the load imposed on floor 12 by cargo containers 38, 40 exceeds a predetermined amount. Thus, when a down load or gust exceeds approximately 1 ¼ G on the cargo containers, the elastomeric strips 76, 78 will start to deflect and, when depressed one eighth inch, the under surface 80 of container lip 82 (FIG. 3) comes into contact with the longitudinal beams 32, 34 so that no further load is imposed on floor 12. The floor load at this time will be equivalent to approximately 1 ¾ G and any additional load up to the maximum design value of system 10 will be carried by the longitudinal and lateral beams to the track fittings. Thus, cargo containers 38, 40 may be rolled into position on the load-carrying system 10 by employing rollers 70 of downstream walk-roller panels 42 and will be supported by rollers 70 and elastomeric strips 76, 78 until a predetermined load is exceeded so that containers 38, 40 will bottom-out on longitudinal beams 32, 34. Thus, lip 82 is normally maintained one eighth inch above an associated one of the longitudinal beams 32, 34.

Figure 6:
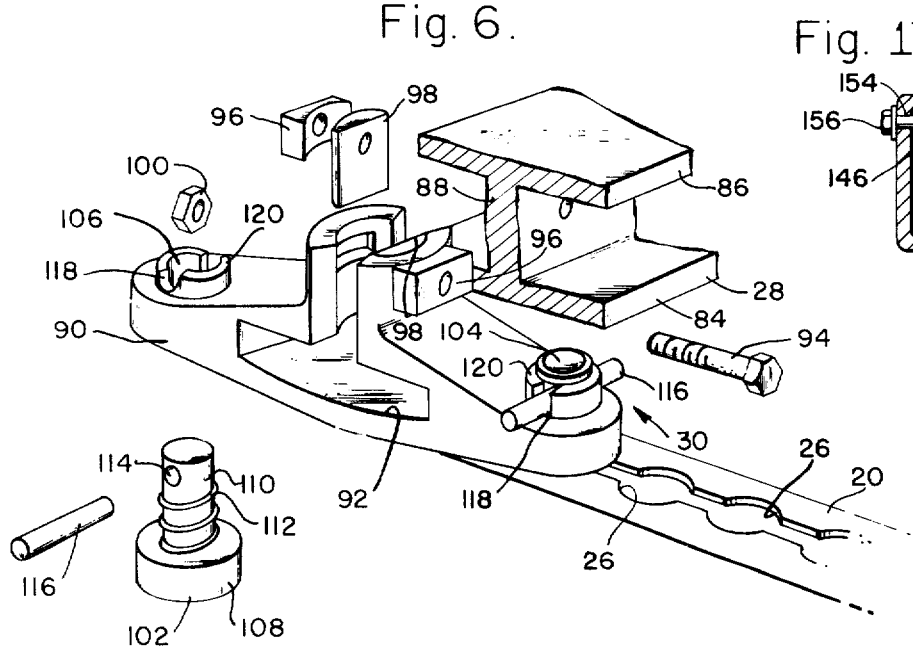
FIG. 6 is an exploded perspective view of the connecting means used to connect the beam of FIGS. 4 and 5 to a track provided on the floor of the vehicle.

The transverse beams 28 and their associated fastening means or track fittings 30 will now be described in connection with FIGS. 4, 5 and 6. Each beam 28 includes a lower flange 84, an upper flange 86 and a connecting web 88. Each track fitting 30 includes a body portion 90 which is provided with an inverted, T-shaped slot 92 adapted to slidably engage lower flange 84 and web 88 and may be secured in position thereon by a single bolt 94 adapted to pass through concave washers 96, spacers 98, and web 88 before threadedly engaging a nut 100. Track fitting 30 includes a pair of plungers 102, 104 which are reciprocably mounted in cavities 106. The plungers 102, 104 each include an enlarged head 108 and a shank 110 and are biased by a compression spring 112 to an extended position where head 108 engages one of the apertures 26 for securing fitting 30 to one of the tracks 18, 20, 22 or 24. Each shank 110 is provided with an aperture 114 which receives a pin 116 adapted to normally seat in a saddle 118 formed in a shoulder 120 at each end of fitting 30. Head 108 may be withdrawn from aperture 26 by lifting pin 116 from saddle 118 and rotating pin 116 approximately 30° so that it will rest on top of shoulder 120. Fitting 30 is adapted to swivel approximately ±10° on beam 28 to assure alignment with curved tracks. The track fittings 30 form approximately 3/16 inch spaces or stand-offs so that beams 28 will clear floor 12. If desired, fittings 30 may be made from stainless steel for corrosion resistance, bolt 94 and nut 100 may be cadmium plated and washers 96 and spacers 98 may be made from aluminum.

The single longitudinal beams 32 and the restraint means 44 will now be described in connection with FIGS. 7-13. Each beam 32 is a rectangular tube beam (see FIG. 3) and includes a first end 121 and a second end 122 (FIGS. 7 and 8) to each of which is secured a bracket for end fitting 124 by suitable bolt and nut assemblies, like the ones shown at 126. Each fitting 124 is adapted to be connected to a transverse beam 28 and includes upper and lower lips 128, 130, respectively, which engage the upper flange 86 (FIG. 8) and a depending leg 132 which engages web 88. Depending leg 132 is provided with an aperture 134 which receives a bolt 136 adapted to pass through an aperture 138, which is provided in web 88, for securing fitting 124 to a transverse member 28. Each bolt 136 may be held in position in fitting 124 by a suitable pin 140 (FIG. 8) which is affixed to fitting 124 adjacent the head 142 of bolt 136.

Figure 13:
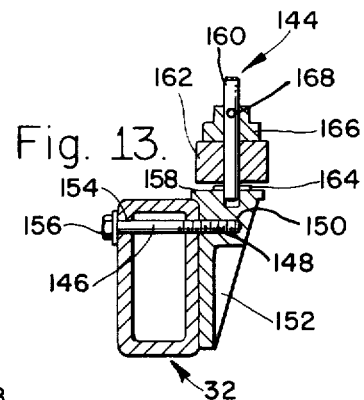
FIG. 13 is a cross-sectional view taken along line 13—13 of FIG. 8.

Each longitudinal beam 32 carries a pair of roller assemblies 144 which guide cargo carriers 38, 40 along the load-carrying system 10 when cargo carriers 38, 40 are pushed into position during loading of a suitable vehicle which will carry a plurality of cargo carriers. As best shown in FIG. 13, each roller assembly 144 is secured to beam 32 by a bolt 146 having a first end 148 frictionally engaging an aperture 150 provided in the body portion 152 of roller assembly 144 and a second end 154 threadedly engaging a nut 156. Body portion 152 of roller assembly 144 includes an upper face 158 which carries an upstanding pin 160 upon which a roller 162 is rotatably mounted. Roller 162 rides on a thrust washer 164, which encompasses pin 160 on top of face 158, and is retained in position on pin 160 by a fastener 166 keyed to pin 160 by a key 168.

Longitudinal beam 32 also carries a lug assembly 170 including a lug 172 carried by a bracket 174 affixed to beam 32 by bolts 176. Lug 172 is adapted to engage a notch 178 (FIG. 2) which is provided in leg 68 of roller tray 48. Lug 172 is engaged by a spring loaded plunger type retainer pin 180 forming part of a retainer fitting 182 which is affixed to leg 68 by suitable fastening means, like the screw shown at 184. Lug 172 and retainer fitting 182 retain the roller trays 48 in position within the structural module defined by a pair of transverse beams 28 and the corresponding longitudinal beams 32.

Referring now to FIGS. 2 and 7-12, the restraint means 44 is connected to beam 32 by bolts 186 and includes a T-shaped, rail restraint 188 having a pair of flanges 190, 192 adapted to overhang lips 82 on containers 38, 40, as shown in FIG. 2 for both containers 38, 40 and in FIG. 3 for container 38. Restraint means 44 also includes a retractable stop 194 having a vertical leg 196 and a horizontal leg 198 (FIG. 9) swingably mounted on beam 32 by a pin 200. The horizontal leg 198 includes a bifurcated end 202 operatively associated with a stop actuating lever 204 swingably mounted on beam 32 by a pin 206 (FIG. 10) and having an end 208 connected to a stop actuating plunger 210 serving as a foot-operated retraction button for stop 194 and biased to an elevated position by a compression spring 212. Plunger 210 may be depressed causing the outboard end 214 to be elevated which, in turn, causes the retractable stop 194 to be retracted. When plunger 210 is depressed, the end 216 of a latching lever 218 engages end 208 of lever 204 locking the plunger 210 in its lowermost position until latching lever 218 is swung counterclockwise (as viewed in FIG. 10) about its pivot 220 by moving end 222 of lever 218 in the direction of arrow 224 by applying foot pressure thereto. Lever 218 is biased by a leaf spring 226 to swing in a clockwise direction (as viewed in FIG. 10) so that end 216 will automatically engage end 208 when plunger 210 is depressed. The retractable stop 194 is adapted to engage each fore and aft corner of cargo containers 38, 40, as best seen in FIG. 2 for one corner of container 38, to prevent fore and aft movement of the containers. The stop 194 may be retracted and elevated by merely actuating the foot operated elements 210 and 222, respectively.

The double longitudinal beams 34 will now be described in connection with FIGS. 2, 14 and 15. Each double beam 34 comprises two single beams 32a, 32b which are connected together by bolts 228 and suitable spacers, like the one shown at 230 in FIG. 14. Each beam 32a, 32b carries the vertical roller assemblies 144, a latching lug 172 and a retractable stop 194. Both beams 32a, 32b share the remaining elements of the restraint means 44.

In use of the present invention, the fore and aft restraints 194 would be depressed by depressing plungers 210. Cargo containers 38, 40 would then be inserted through the door opening of a vehicle onto a conventional ball mat and then pushed along rollers 70 to the farthest extend possible, either forward or aft depending on whether the cargo loading door is located in the rear or forward part of the vehicle. At the end of the desired travel, the first cargo containers 38, 40 may be retained at their upstream transverse ends by conventional terminal locks. The first ends 222 of latches 218 downstream of cargo containers 38, 40 would then be actuated to elevate the applicable restraints or stops 194. The next pair of cargo containers 38, 40 could then be pushed along rollers 70 until the upstream ends thereof engage the restraints 194 previously elevated for restraining the downstream ends of the first cargo containers 38, 40. Another set of upstream restraints 194 would then be elevated and this procedure of loading cargo containers 38, 40 would be repeated until the vehicle is fully loaded.

It will be noted from FIG. 1 that the restraint means 44 are located intermediate the ends of the longitudinal beams 32, 34 so that the major portion of the weight of cargo containers 38, 40 will lie over a structural module formed by two transverse beams 28 and their associated longitudinal beams 32.

It will be seen that the invention includes a plurality of interconnected structural modules with each module comprising two transverse beams with at least two track attachment fittings interconnected by two single and one double longitudinal beams. The end fittings of the longitudinal beams rest on the flange of the transverse beams for torsional stability and a single captive bolt forms the structural connection. Normally these components would remain assembled when they are removed from the vehicle for storage. It will also be seen that a walk-roller panel is provided for each module and that these panels are separate assemblies comprising a balsa panel laminated with aluminum sheets and having a roller tray permanently mounted along each side. After installation of any structural module or pair of transverse beams, and the corresponding longitudinal beams, the walk-roller panels may be set in place and retained by the fixed lug on one side and the spring loaded lock pin on the other side.

It is an important feature of the invention that each roller tray is supported by resilient means so that these relatively lightweight structures are not damaged by load forces introduced by external causes. The elastomeric strips of the above-described embodiment avoid overloading of the roller trays and the floor panels by starting to deflect when the cargo containers are subjected to a down load exceeding approximately 1¼ G. When the strips are depressed one eighth inch, the undersurface of the lip of the container edge rail comes in contact with the longitudinal beams and no further load is imposed on the floor. The floor load at this point will be equivalent to approximately 1¾G and any additional load up to a maximum design value of the structural modules, will be carried by the longitudinal and lateral beams to the track fittings.

The longitudinal beams restrain the containers for all load conditions. The longitudinal beams may be made in three configurations comprising a left-hand single beam, a right-hand single beam and a double beam. All beam assemblies may be made up with identical detail components which are merely assembled in different manner and quantity to form the necessary configurations. The lower surfaces of the longitudinal beams are maintained approximately three sixteenth inch above the floor so that the beams will not introduce extraneous loads onto the floor by coming in contact therewith.

The transverse beams are the main load distribution mediums of each module and span at least two floor tracks in all cases. The inboard track fittings for the transverse beams may be attached by one bolt through the beam web and two screws through the lower flanges which carry the lateral shear loads. The other fittings may be attached only by the bolt through the beam web. This system minimizes track spacing tolerance problems and assures a predetermined load path to the inboard track. The other fittings have loose hole connections and the fittings are designed to pivot so that they will align with a curved track. The fittings encompass the lower beam flanges and maintain the beams approximately three sixteenth inch above the floor.

In certain applications, it may be desirable that no load be placed on the floor panels. Accordingly, in accordance with another embodiment of the invention, walk-roller panels 42' which are similar to the previously described panels 42, are provided with load pins 232 at each of the panels' corners, as illustrated for one of the corners in FIG. 16. As can be seen in this figure, the load pins 232 span the upper portions of the legs 62' and 68'. Each of the pins 232 is supported on top of a pair of support fingers 234 that extend outwardly from a resilient support fitting assembly 236. The support fitting assemblies 236 are mounted back-to-back on each side of the web portion 238 of the transverse beam 28 by the use of appropriate elongated bolts 240 extending through web holes 241 in the beam 28 and through associated and somewhat oversize bores 242 in the body portion 243 of the fitting assemblies, as illustrated in FIG. 17. A cylindrical opening 244 is provided in a rear face 246 of each of the body portions 243 to house one or more Bellville washers 248 mounted in tandem on a keeper bolt 250 so a predetermined preload can be applied by nut 251. When these support assemblies are mounted in place adjacent the beam 28, the head of the keeper bolt 250 is adjacent the web portion 238 and the opposite end of the bolt extends through an oversize hole 252 in the body 243, coaxial with the cylindrical opening 244. The bolts 240 may be threaded and provided with a stop nut 253 that is tightened to a snug fit to allow free pivoting of the fitting bodies 243.

In utilizing this embodiment of the invention, the cargo containers 38, 40 may be rolled to desired locations on the walk-roller panels 42' and locked in place by the restraint means 44 whereby the containers are positioned with their extremities, along the longitudinal axis 14, located intermediate an adjacent pair of transverse beams 28, as illustrated in FIG. 1. Once so located, the weight of the containers is supported by the walk-roller panels 42', the support fitting assemblies 236, and in turn by the transverse beams 28. However, under severe loading conditions that would possibly degrade the integrity of the lightweight components associated with the walk-roller trays 42', the load pin-supporting fingers 234 of the fitting assemblies 236 will pivot downwardly against the bias of the Bellville washers 248 that are placed under compressive load by such pivoting movement. If the load exceeds a predetermined safe magnitude, the roller trays will be lowered (against the spring bias of the Bellville washers) until the undersurface of the lip of the container edge rail is in contact with the longitudinal beams and no further load is imposed on the walk-roller trays. As in the previously described embodiment of the invention, the total deflection of the containers in a downward direction may be on the order of one eighth inch.

Although certain specific materials have been specified for use in fabricating the items of the present invention, it should be noted that the materials used in this fabrication are not considered critical and any materials generally considered satisfactory for a particular use or function may be utilized.

From the foregoing, it should be evident that there has herein been described a load-carrying structural system for vehicles that overcomes many disadvantages of the prior art and which constitutes a significant advancement of the art.

Although exemplary embodiments of the invention have been shown and described, changes and modifications and other embodiments of the invention may be made by one having ordinary skills in the art without necessarily departing from the spirit and scope of the invention.

What is claimed is:

1. A load-carrying system for vehicles carrying cargo containers and having floor structure including a major axis, a minor axis and a plurality of spaced-apart rails secured to said floor structure substantially parallel to said major axis, said rails being spaced apart by a distance greater than the width dimension of the cargo containers measured along said minor axis, said load-carrying system comprising:
   at least two transverse beams;
   first fastening means connecting said transverse beams to said rails substantially normal thereto, said first fastening means maintaining said transverse beams in spaced-apart relationship and above said floor structure;
   at least two longitudinal beams;
   second fastening means connecting said longitudinal beams to said transverse beams substantially normal thereto, said second fastening means maintaining said longitudinal beams in spaced-apart relationship and above said floor structure, said longitudinal beams being spaced to coincide with the width dimensions of the cargo containers;
   stop means provided on at least some of said longitudinal beams for maintaining a cargo container in position thereon; and
   means normally supporting said container in spaced relationship above said longitudinal beams, said supporting means including resilient means which carry a predetermined load imposed by said container, said resilient means transferring loads exceeding said predetermined load directly to said longitudinal beams.

2. A load-carrying structure as stated in claim 1 wherein said stop means are carried by said longitudinal beams and are located intermediate said transverse beams.

3. A load-carrying structure as stated in claim 1 including foot-operated retraction means connected to each stop means for retracting said stop means from a normally extended cargo-restraining position.

4. A load-carrying structure as stated in claim 3 including latch means engageable with said retraction means for locking said retraction means in a depressed non cargo restraining position.

5. A load-carrying system as stated in claim 1 wherein said means normally supporting said container includes a roller tray having rollers supporting said container.

6. A load-carrying system as stated in claim 5 wherein said resilient means is an elastomeric means carried by said roller tray and engaging said floor structure to support said predetermined load thereon.

7. A load-carrying system as stated in claim 5 wherein said container includes a bottom portion resting directly on said rollers and edge rails extending over said longitudinal beams in spaced-relationship therewith, said edge rails being adapted to bottom-out on said longitudinal beams when said resilient means transfers said load directly thereto.

8. A load-carrying system as stated in claim 5 wherein said resilient means comprises resilient washers transferring said predetermined load from said roller tray to said transverse beams.

9. A load-carrying system as stated in claim 5 wherein said roller tray includes four corners and wherein said resilient means comprises:
   a load pin carried by each of said roller-tray corners;
   a support fitting assembly supporting each of said load pins; and
   resilient washer means rockably connecting each support fitting assembly to one of said transverse beams, whereby said load which exceeds said predetermined load will rock said support fitting assemblies to a position wherein said container bottoms out on said longitudinal beams.

* * * * *